United States Patent [19]

Wilhelm et al.

[11] Patent Number: 4,590,372

[45] Date of Patent: May 20, 1986

[54] MEASURING ARRANGEMENT FOR DETERMINING THE GASEOUS RADIOIODINE CONCENTRATION IN A CARRIER GAS

[75] Inventors: Jürgen Wilhelm, Gondelsheim; Heinrich Mahnau, Hamburg, both of Fed. Rep. of Germany

[73] Assignee: Kernforschungszentrum Karlsruhe GmbH, Karlsruhe, Fed. Rep. of Germany

[21] Appl. No.: 586,129

[22] Filed: Mar. 5, 1984

[30] Foreign Application Priority Data

Mar. 3, 1983 [DE] Fed. Rep. of Germany ....... 3307439

[51] Int. Cl.⁴ .............................................. G01T 7/04
[52] U.S. Cl. .................................... 250/304; 250/364; 250/380
[58] Field of Search ............... 250/393, 304, 364, 380, 250/432 R

[56] References Cited

U.S. PATENT DOCUMENTS 3,590,247 6/1971 Holford ................................ 250/304
3,864,574 2/1975 Wilhelm et al. ..................... 250/364
3,982,129 9/1976 Lattin et al. ......................... 250/304
4,304,994 12/1981 Yamazaki et al. .................. 250/304

FOREIGN PATENT DOCUMENTS 2251189 6/1982 Fed. Rep. of Germany .

Primary Examiner—Alfred E. Smith
Assistant Examiner—Carolyn E. Fields
Attorney, Agent, or Firm—Spencer & Frank

[57] ABSTRACT

Measuring arrangement for determining the concentration of gaseous radioiodine in a carrier gas, composed of a mass of sorption agent for separating the gaseous radioiodine from the carrier gas and for accumulating the separated radioiodine, with a part of the mass of sorption agent being located in a measuring region, a conduit for conducting the carrier gas to the sorption agent and provided with at least one outlet via which carrier gas can flow into the measuring region containing sorption agent, and a radiation detector disposed for detecting radiation emanating from the measuring region, with the sorption agent being movable relative to the conduit for bringing different portions of the mass of sorption material into the measuring region.

10 Claims, 4 Drawing Figures

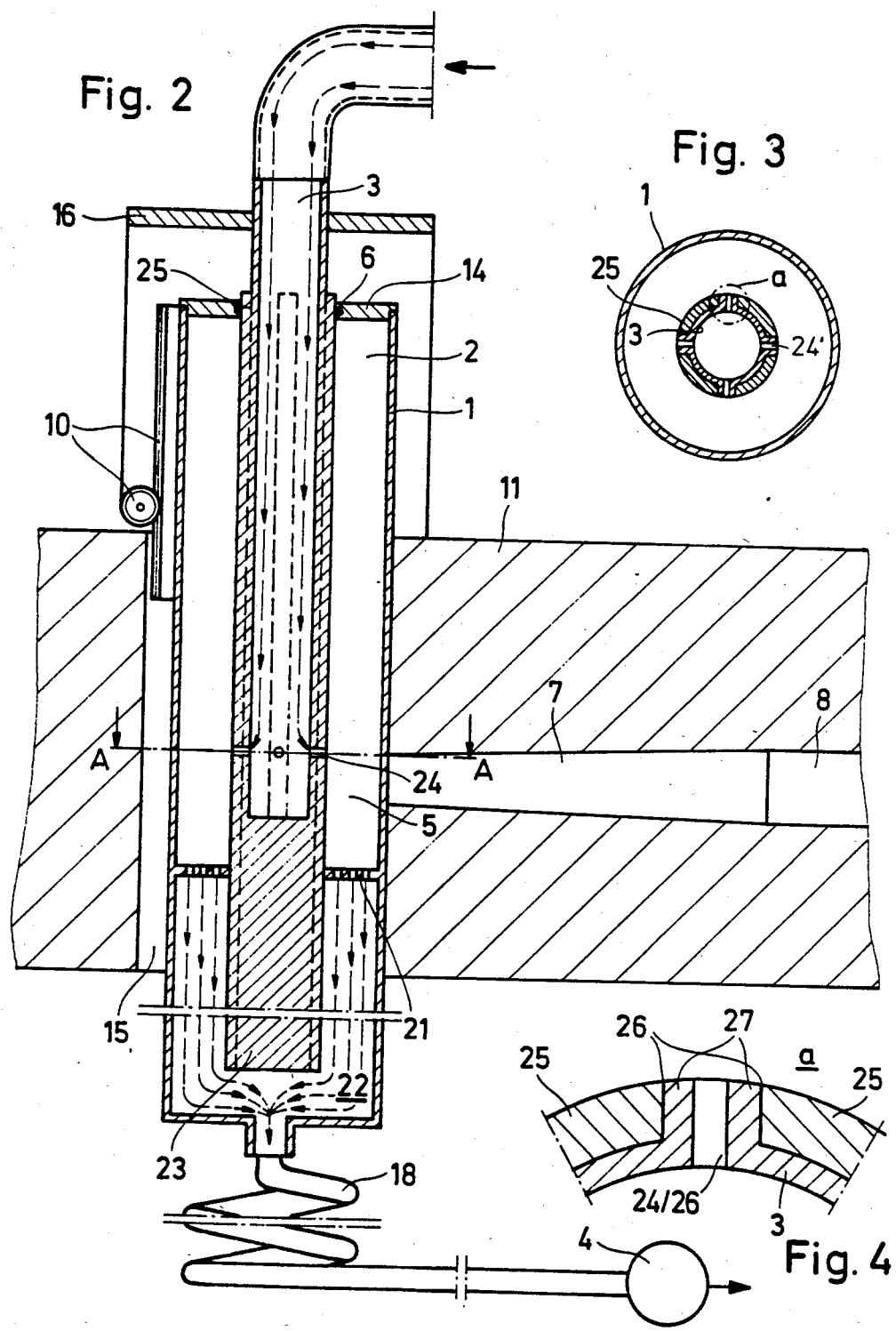

MEASURING ARRANGEMENT FOR DETERMINING THE GASEOUS RADIOIODINE CONCENTRATION IN A CARRIER GAS

BACKGROUND OF THE INVENTION

The present invention relates to a measuring arrangement for determining the gaseous radioiodine concentration in a carrier gas wherein the radioiodine is separated in a sorption agent and accumulated and the radioiodine activity is detected by means of a detector.

In nuclear plants, particlarly in nuclear energy plants, it is important to measure the emission of gaseous radioactive iodine isotopes, particularly $^{131}$I.

Since the concentration of radioiodine in the air of the plant and particularly at its chimney is extremely low, a relatively large amount of exhaust air must be conducted through a suitable adsorber, e.g. catalyst material impregnated with $AgNO_3$, to obtain measurable activity by way of accumulation at the sorption agent. In the meantime, highly sensitive measuring instruments have become available for this purpose. In principle, these instruments are comprised of an adsorber cartridge through which passes a large volume stream, and a detector for gamma quanta, e.g. a scintillation detector employing an NaI/Tl crystal or a semiconductor detector, such as, for example, Ge(Li) as disclosed in German Pat. No. 2,251,189. The aim of these measuring devices is the realization of the highest possible detection sensitivity so as to be able to accurately measure the extremely small amounts of iodine released through the chimney.

However, the dynamic range of such highly sensitive measuring devices is limited. In case of serious malfunction, iodine concentrations of such magnitude could occur that the measuring range would be insufficient. It thus initially appears to be obvious to measure very high iodine concentrations in the air directly. However, the latter is not possible since in addition to the radioiodine, radioactive noble gases exist simultaneously in the air and their concentration is orders of magnitude higher than that of the radioiodine so that they would completely overdrive the detector. Therefore, accumulation on an adsorber is necessary even with very high radioiodine concentrations so as to be able to raise the iodine concentration component with respect to the noble gas concentration. The sorption agent is here advantageously accommodated in easily replaceable cartridges.

An arrangement is known, for example, which operates with a turntable in which a large number of sorption cartridges are accommodated. If the activity of the radioiodine collected in one cartridge becomes too high for the detector, the turntable is caused to undergo a rotation step and makes available a fresh sorption cartridge.

In another arrangement, operating according to a similar principle, the sorption agent is disposed between the sides of a stepwise movably toothed wheel.

Both arrangements have in common the stepwise switching from one sorption cartridge or chamber to the next one so that continuous operation is impossible. Moreover, both arrangements require considerable engineering expenditures for secure sealing arrangements.

SUMMARY OF THE INVENTION

It is now an object of the present invention to provide a measuring arrangement of the above-mentioned type with which, in the case of a malfunction, radioiodine concentrations can be detected continuously in the presence of radioactive noble gases.

The above and other objects are achieved, according to the invention, by a novel measuring arrangement for determining the concentration of gaseous radioiodine in a carrier gas, which arrangement includes: means including a mass of sorption agent for separating gaseous radioiodine from the carrier gas and for accumulating the separated radioiodine, with a part of the mass of sorption agent being located in a measuring region; means defining a conduit for conducting the carrier gas to the sorption agent and having an outlet portion surrounded by the sorption agent and provided with at least one outlet via which carrier gas can flow into the measuring region containing sorption agent; and a radiation detector disposed for detecting radiation emanating from the measuring region; wherein the means including a sorption agent are movable relative to the means defining a conduit for bringing different portions of the mass of sorption material into the measuring region.

BRIEF DESCRIPTION OF THE DRAWING

FIG. 2 is a view similar to that of FIG. 1 of a second preferred embodiment of a measuring arrangement according to the invention.

FIG. 3 is a cross-sectional view taken along line A—A of FIG. 2.

FIG. 4 is a cross-sectional detail view of the region enclosed by circle a in FIG. 3.

DESCRIPTION OF THE PREFERRED EMBODIMENTS

Figure 1:
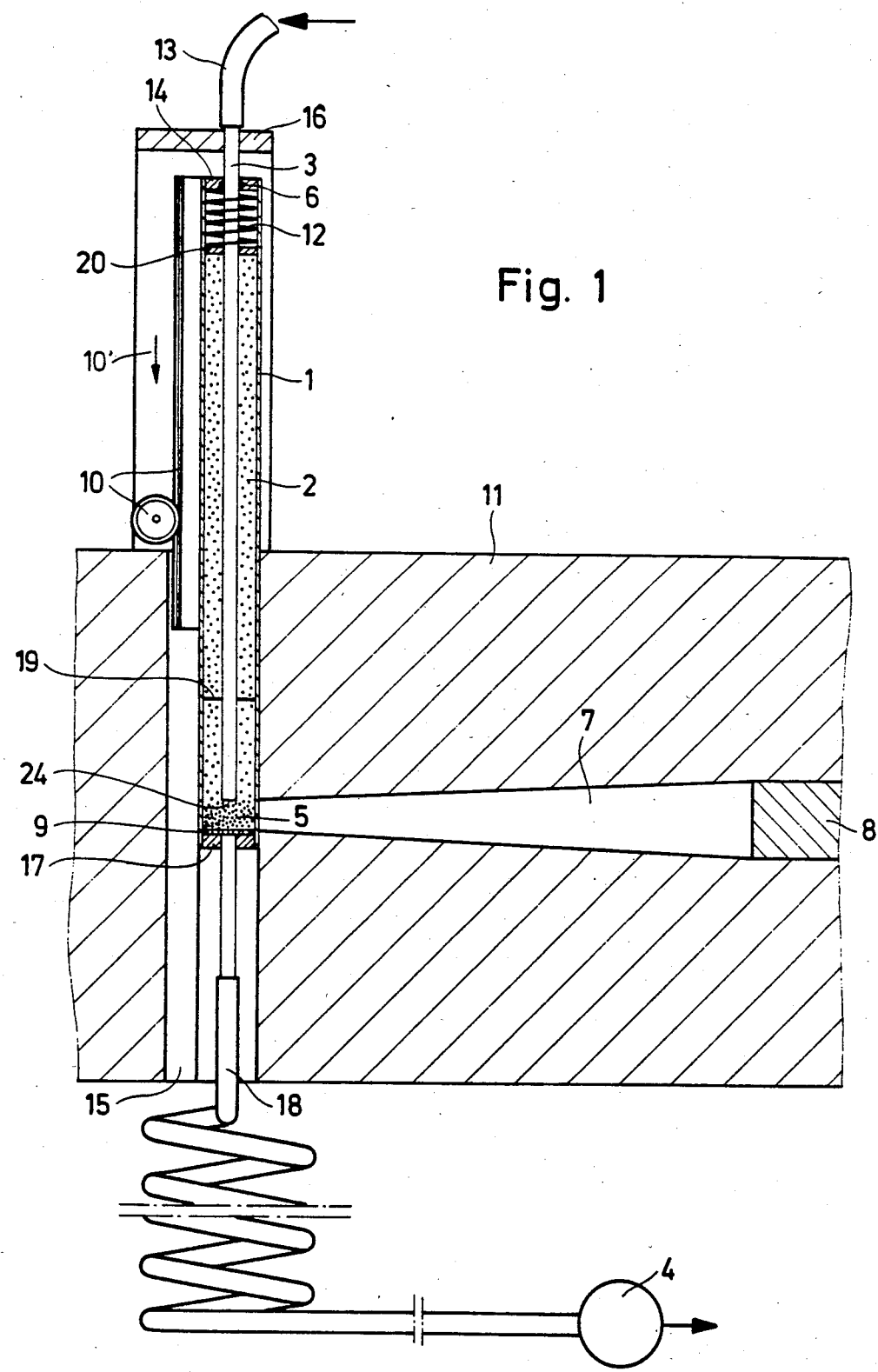
FIG. 1 is a simplified elevational cross-sectional view of one preferred embodiment of a measuring arrangement according to the invention.

FIG. 1 is a schematic, longitudinal sectional view of one embodiment of a radioiodine measuring arrangement according to the invention. A medium which includes the carrier gas and the radioactive iodine enters via a hose 13 into a vertically arranged, elongate conduit 3 enclosed, at least over part of its length, in a concentically arranged tube 1 having a larger exterior diameter. Conduit 3 is centered and sealed by means of a seal 6 disposed in an end cap 14 of tube 1.

Tube 1 and conduit 3 are arranged in a recess 15 in the form of a through bore provided in a lead shield 11 for a detector 8. Shield 11 is also provided with a radiation entry channel 7 which leads away from recess 15, preferably at a right angle thereto, to detector 8 and which may easily be widened toward detector 8. The combined arrangement of tube 1 and conduit 3 is advantageously suspended in recess 15 in such a manner that the jacket surface of tube 1 rests against the entrance opening of radiation entry channel 7. The suspension of the arrangement is effected by way of a mounting ring 16 carried by shield 11 and supporting conduit 3 and by way of a drive 10 with which tube 1 can be moved vertically relative to conduit 3, parallel to arrow 10'.

Drive 10 may conveniently be a ratchet and pinion mechanism, with the pinion being rotatably mounted on the support for ring 16.

Conduit 3 extends only over part of tube 1 and does not extend into a region 5 which is to be considered the part of the sorption agent volume in the measuring position. Tube 1 is closed by a further end cap 17 through which extends a continuation 18 of conduit 3.

Continuation 18 communicates with the interior of tube 1 to permit discharge of the carrier gas by means of a pump 4 once it has been cleansed of radioiodine.

Tube 1 is filled to at least a major portion with a suitable sorption granulate 2 which is pourable. In the lower portion of tube 1, i.e. in region 5, the sorption agent 2 is retained by a permeable screen 9. Conduit 3 ends shortly above partial volume 5, where it forms an exit opening 24 so that the measuring medium can leave from there and enter into sorption agent 2. Mounts 19 may be connected to conduit 3 to slidably engage the inner surface of tube 1 in order to fix the position of the free end of conduit 3.

In the upper portion of tube 1, there is disposed a compression spring 12 which acts on a movable plate 20 and is supported at end cap 14. Plate 20 is longitudinally displaceable within tube 1. Displacement of plate 20 under the action of spring 12 causes the flowable sorption agent 2 to be continuously pressed into new partial regions 5 available for the measurements, whenever tube 1 is moved downwardly relative to conduit 3, agent 2 particularly moving into the space previously occupied by the lower end of conduit 3. Extension 18 is helically coiled to have sufficient flexibility to allow for the vertical movement of tube 1.

FIG. 2 is an elevational cross-sectional view of a second embodiment which, in its most essential parts, corresponds to that of FIG. 1. The same reference numerals have been employed for corresponding elements, whose function will not be described again. The only change is in the arrangement of tube 1' and conduit 3'. The movement of these parts relative to one another for the purpose of continuously generating new partial regions 5 in the measuring position is likewise effected by drive 10. However, tube 1' is here an adsorber cartridge containing sorption agent 2. In the lower portion of tube 1', a screen plate 21 is fastened thereto to retain sorption agent 2 and to separate it from a gas collection chamber 22 which is connected with pump 4 via conduit 18. Conduit 3' is closed below lateral exit openings 24'. Plate 21 also fixes the position of the lower portion of conduit 3'.

The medium to be measured again flows into conduit 3', which is fastened to mount 16, and from there through exit openings 24' arranged around conduit 3' in one plane at the height of the upper edge of radiation entry channel 7 and into sorption medium 2. The arrangement of exit openings 24' is depicted in FIG. 3. The flow of the measuring medium is indicated by arrows.

The region of conduit 3' which extends through tube 1' is provided with an outer tube 25 which delimits the inner boundary of the sorption agent region of the adsorber cartridge. Tube 25 is provided with longitudinal slits 26 corresponding in number to, and longitudinally aligned with, openings 24', four such openings being shown in FIG. 3. Conduit 3' itself forms an inner jacket for tube 25 and is provided with longitudinal, radially projecting bars 27 which engage in these slits in a manner to seal tube 25. Openings 24' are formed in bars 27. Openings 24' are located to deliver the medium leaving tube 3' into sorption agent in region 5 aligned with entry channel 7.

When tube 1' is displaced with respect to conduit 3', all of the sorption medium can thus be charged in successive portions with radioiodine, either continuously or discontinuously.

The lead shielding 11, and this applies for the embodiments of both FIGS. 1 and 2, is provided with bore 7 which takes care that the radiation Ge-detector 8 is subjected only to that radiation which originates from the part of volume 5 of inorganic sorption material 2 (AC6120) presently being used, with this partial volume 5 being selected in such a manner that the degree of iodine separation is, for example, greater than 90%.

The rate of advance of drive 10 must here be selected in such a manner that the desired measuring region has the necessary sensitivity for iodine concentrations. A slow rate of advance here corresponds to a high measuring sensitivity and, conversely, a fast rate of advance corresponds to a low measuring sensitivity. The apparatus measures in pulses per second the pulse rate furnished by detector 8.

However, according to the present invention, the measuring arrangement may also be operated in such a manner that the output pulse rate from detector 8 is kept constant at a certain value by correspondingly adjusting the rate of advance via a regulating circuit to compensate for any detected pulse rate changes. In this case, the rate of advance is the measure for the iodine concentration. Increasing iodine concentrations result in a faster advance of sorption material 2 and thus, overloading of radiation detector 8 is automatically prevented.

It will be understood that the above description of the present invention is susceptible to various modifications, changes and adaptations, and the same are intended to be comprehended within the meaning and range of equivalents of the appended claims.

What is claimed is:

1. Measuring arrangement for determining the concentration of gaseous radioiodine in a carrier gas, comprising: means including a mass of sorption agent for separating gaseous radioiodine from the carrier gas and for accumulating the separated radioiodine, with a part of the mass of sorption agent being located in a measuring region; means defining a conduit for conducting the carrier gas to said sorption agent and having an outlet portion surrounded by said sorption agent and provided with at least one outlet via which carrier gas can flow into the measuring region containing sorption agent; and a radiation detector disposed for detecting radiation emanating from the measuring region; wherein said means including a sorption agent are movable relative to said means defining a conduit for bringing different portions of the mass of sorption material into the measuring region.

2. An arrangement as defined in claim 1, wherein said means including a mass of sorption agent comprise a tube housing said mass and concentrically surrounding said conduit, with at least one of said tube and conduit being movable and further comprising a shielding body having a shielded radiation entry channel extending between the measuring region and said detector.

3. An arrangement as defined in claim 2, further comprising drive means connected for moving said tube relative to said conduit.

4. An arrangement as defined in claim 2, wherein said conduit is interrupted within said tube to define said outlet, said outlet is disposed at a location adjacent said radiation entry channel, and said means including a mass of sorption agent further comprise a spring element disposed for urging sorption agent toward the measuring region.

5. An arrangement as defined in claim 2, wherein: said mass of sorption agent is movable with said tube relative to said conduit; said tube comprises retaining means at its ends for retaining said mass of sorption agent in said tube; and said arrangement further comprises guide means extending between said tube and said conduit for positioning said conduit relative to said tube transversely to the direction in which they are relatively movable.

6. An arrangement as defined in claim 5, wherein: said conduit comprises an outer tubular member; said outer tubular member and said tube together constitute a cartridge housing said mass of sorption agent, with said outer tubular member constituting an interior tube of said cartridge; said outer tubular member is provided with a plurality of longitudinally extending slits; said conduit further comprises an inner tubular member in contact with said outer tubular member and provided with a plurality of longitudinally extending, radially projecting bars each fitted into a respective slit in a manner to seal said slit; and each bar is provided with a passage constituting a respective outlet of said conduit.

7. An arrangement as defined in claim 1, wherein the radioiodine concentration is determined on the basis of the duration of delivery of carrier gas to said sorption agent and the activity of the radioiodine collected by said sorption agent.

8. An arrangement as defined in claim 1, wherein: said means including a mass of sorption agent comprise a tube housing said mass and concentrically surrounding said conduit, with at least one of said tube and conduit being movable; said conduit is interrupted within said tube to define said outlet and said means including a mass of sorption agent further comprise a spring element disposed for urging sorption agent toward the measuring region.

9. An arrangement as defined in claim 1, wherein said means including a mass of sorption agent comprise a tube housing said mass and concentrically surrounding said conduit, with said mass of sorption material being movable with said tube relative to said conduit; said tube comprises retaining means at its ends for retaining said mass of sorption agent in said tube; and said arrangement further comprises guide means extending between said tube and said conduit for positioning said conduit relative to said tube transversely to the direction in which they are relatively movable.

10. An arrangement as defined in claim 9, wherein: said conduit comprises an outer tubular member; said outer tubular member and said tube together constitute a cartridge housing said mass of sorption agent, with said outer tubular member constituting an interior tube of said cartridge; said outer tubular member is provided with a plurality of longitudinally extending slits; said conduit further comprises an inner tubular member in contact with said outer tubular member and provided with a plurality of longitudinally extending, radially projecting bars each fitted into a respective slit in a manner to seal said slit; and said bar is provided with a passage constituting a respective outlet of said conduit.

* * * * *